Oct. 12, 1965  S. N. TOWER  3,211,623
NEUTRONIC REACTOR AND FUEL ELEMENT THEREFOR
Filed April 22, 1960  6 Sheets-Sheet 1

INVENTOR
Stephen N. Towe
BY
ATTORNEY

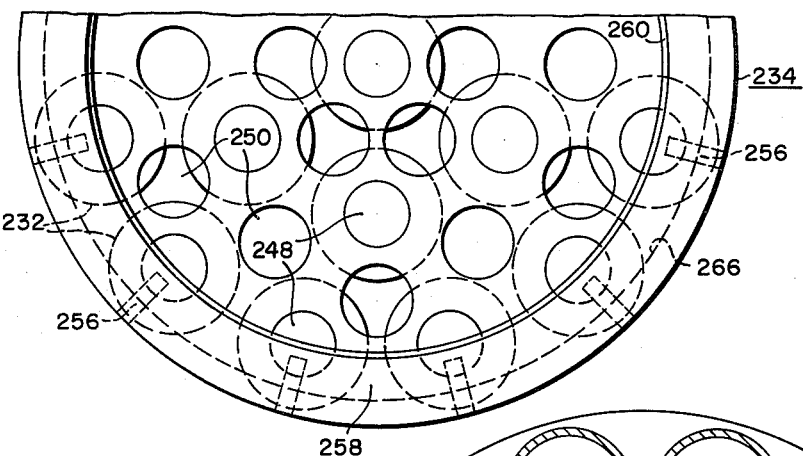
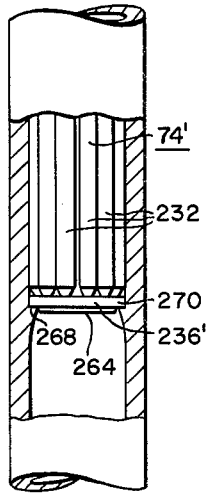
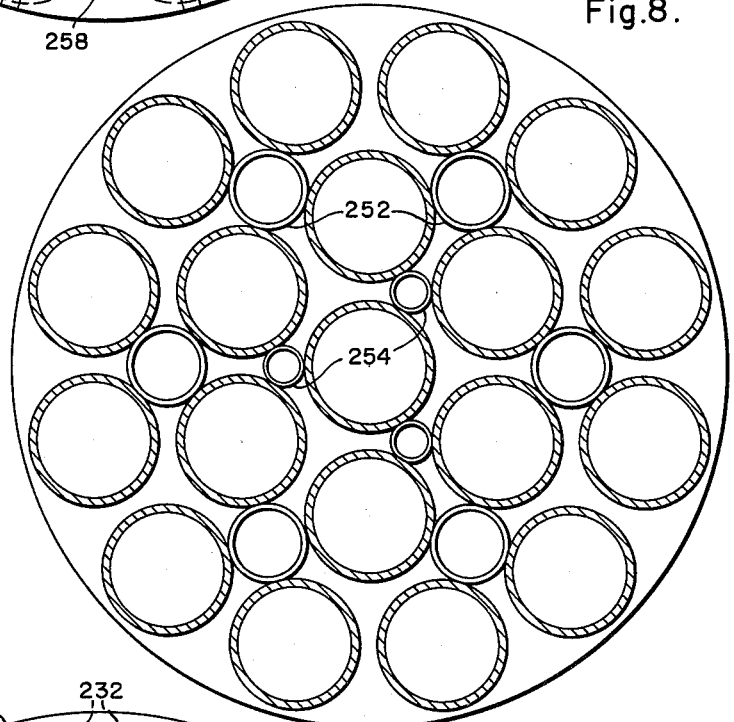
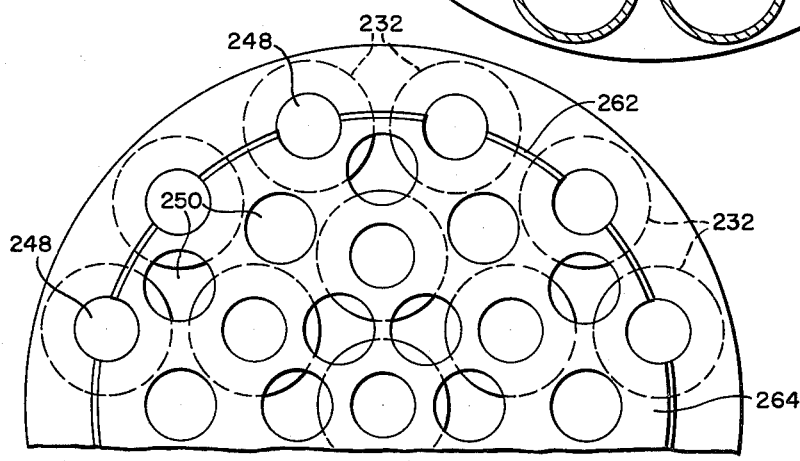

United States Patent Office

3,211,623
Patented Oct. 12, 1965

3,211,623
NEUTRONIC REACTOR AND FUEL
ELEMENT THEREFOR
Stephen N. Tower, Murrysville, Pa., assignor to Westinghouse Electric Corporation, East Pittsburgh, Pa., a corporation of Pennsylvania
Filed Apr. 22, 1960, Ser. No. 24,128
16 Claims. (Cl. 176—42)

The present invention rlates to a neutronic reactor particularly of the pressure tube variety and to novel arrangements thereof and additionally to unique control and fuel element arrangements for use therein.

As is well known, a neutronic power reactor is arranged for transferring the heat developed in the fissioning process maintained in the core of the reactor to a suitable working fluid such as steam. Such fissioning is maintaining by a chain reaction in a mass of fissionable isotope, such as $U^{233}$, $U^{235}$, $Pu^{239}$, or combinations thereof, confined within the core of the reactor. The fissioning process of course is induced by the capture of a thermalized neutron which in turn results in the splitting of the fissionable atom into additional neutrons and fission fragments. The latter neutrons are categorized as fast and are thermalized by moderator material admixed with or juxtaposed to the fissionable material. The fissioning process, therefore, becomes chain reacting as long as sufficient thermalized neutrons are made available for each succeeding generation of fissions. The fissioning and moderating materials usually are surrounded by a neutron-reflecting material for improvement in neutron economy. The thermalized neutron flux level, however, is controlled by the positioning or presence of the control rods or other control members employed in the reactor.

Previously proposed reactor schemes suffered from the disadvantages that the reactors were limited in size due to the extreme wall thickness of the pressure vessels required therefor; it was necessary to remove an extremely large pressure vessel head in order to refuel or recycle the fuel elements, which removal and replacement necessitated the use of meticulously adjustable remote handling equipment for replacing gaskets and other components associated with the vessel head; the pressure drops through the reactor core were relatively large, thereby limiting the thermal output of the reactor; many of the components of previous reactors were so large that a replacement inventory thereof was virtually impossible; it was necessary to pressurize the moderator chamber of the reactor due to the excessive heat transfer thereto from the fuel material; as a result the control rod drive mechanisms had to be pressurized and in addition adapted for relatively high temperature operation; and it was difficult to align the fuel elements of each pressure tube in order to afford continuous flow passages extending through the fuel elements.

The reactor arangement of this invention is advantageous in that ready access is afforded for refueling the reactor; control of the reactor is effected by varying the moderating or reflecting capabilities of the reactor, by employing a novel control rod arrangement, or by employing a combination of both of these arrangements; an improved structure is incorporated for circulating coolant through the pressure tubes and for recycling fuel elements within each pressure tube or among the array of pressure tubes; the neutronic moderator, which in this example is liquid, can be operated at atmospheric pressure without boiling the moderator; the reactor can be refueled readily without being hampered by the presence of control rod channels or drive mechanisms; the unique structure of the pressure tubes and connecting conduits permits facile refueling and the presence of some boiling within the tubes; and the unique design of the fuel elements for the reactor permits ready insertion or withdrawal of the elements relative to the corresponding pressure tubes, alignment therein, continuity of flow passages therethrough, and allowance for differential thermal expansions among the components of each fuel element.

In view of the foregoing, an object of the present invention is the provision of a novel and efficient neutronic reactor arrangement, particularly of the pressure tube variety. More specifically, this objective includes the provision of novel and efficient forms of fuel element and pressure tube arrangements adapted for use in the reactor of the character described.

Another object of the invention is the provision of a neutronic reactor in which control is effected by variation of reflective capabilities of the reactor system in a novel manner.

A further object of the invention is the provision of novel manifolding means associated with the pressure tubes of this type of reactor for increasing the volumetric flow of fluids through the pressure tubes and for reducing pressure drops thereacross.

Antoher object of the invention is the provision of novel and efficient control arrangements for use with a neutronic reactor, particularly the pressure tube variety.

Still another object of the invention is the provision of a novel fuel element assembly adapted for use in such pressure tubes and having means associated therewith for ensuring continuous coolant flow passages through an array of the fuel members when inserted in tandem into the pressure tubes and for affording differential expansion between the individual components of each fuel element assembly.

These and other objects, features and advantages of the invention will be explained more fully during the forthcoming description of illustrative embodiments of the invention with a description being taken in conjunction with the accompanying drawings, wherein:

FIG. 7 is a partial, top plan view of the fuel assembly depicted in FIG. 6;

FIG. 8 is a cross sectional view of the fuel assembly in FIG. 6 taken along reference lines VIII—VIII thereof;

FIG. 9 is a partial bottom plan view of the fuel assembly illustrated in FIG. 6; and, FIG. 10 is a partial elevational view of a pressure tube, with parts being broken away to illustrate one manner of supporting the fuel assembly therein.

In accordance with the invention a pressure tube reactor is provided in which the tubes are arranged so that their active portions are immersed in a tank of moderator fluid maintained substantially at atmospheric pressure. The moderator fluid in this example is deuterium oxide or heavy water ($D_2O$) so that the enrichment of the fuel may be kept as low as possible even to the extent that natural uranium can be employed initially as a fuel. The moderator tank is surrounded by a reflector tank which communicates therewith. However, novel means are provided for varying the height of fluid in the reflector tank while maintaining the height of the moderator fluid constant, if desired, in order to afford a means for controlling the reactor. The pressure tubes can be provided with insulation to minimize heat loss to the low-pressure moderator compartment. Novel control arrangements are provided in combination with the reactor reflecting means and the moderating chamber in order to confine the fissional process within desired limits. A unique manifolding arrangement is provided at least at the hot or outlet ends of the pressure tubes to decrease the pressure drops thereacross and, in the event of some boiling within the pressure tubes, to accommodate the additional volume of coolant. Each of the pressure tubes is loaded with two or more fuel elements of the invention which are constructed, inter alia, to reduce the pressure drop thereacross and to facilitate alignment of the fuel elements and handling thereof during refueling or recycling operations.

Figure 1:
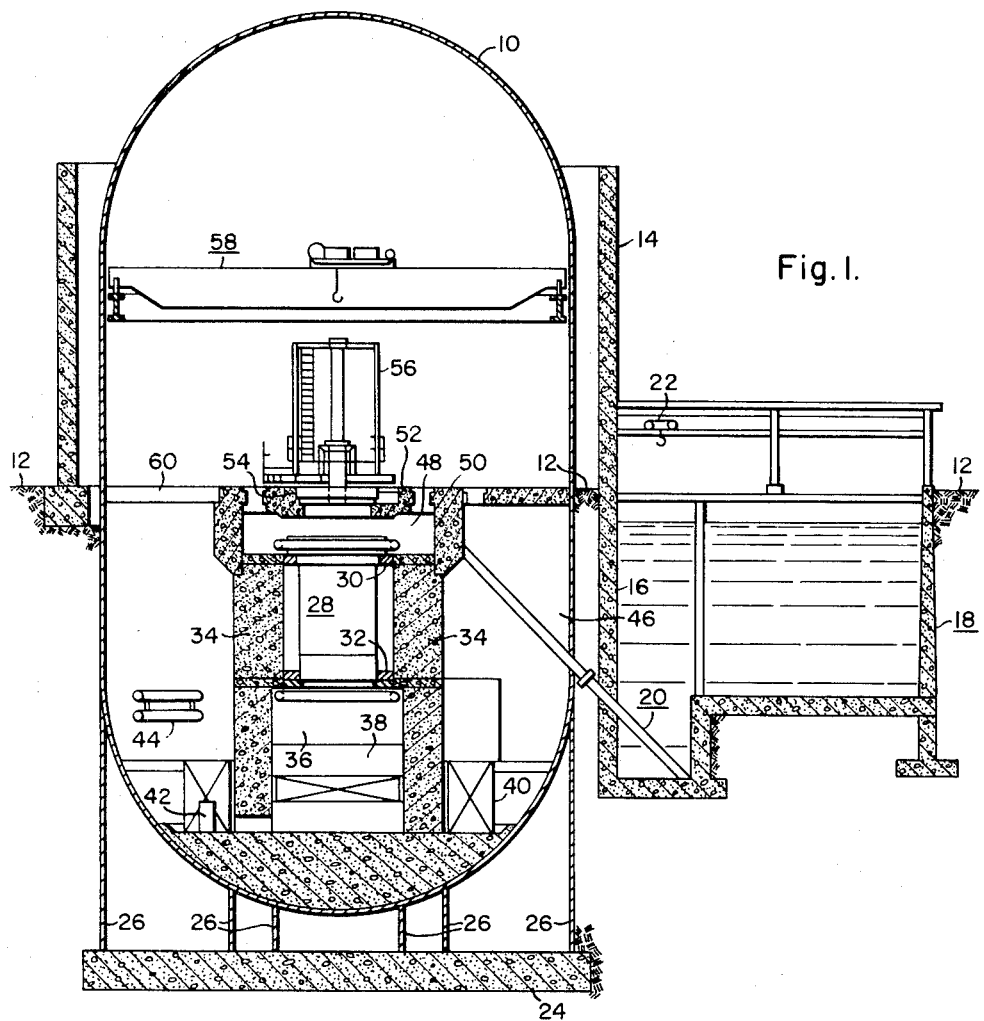
FIGURE 1 is a vertical sectional view of that portion of the plant immediately associated with the neutronic reactor and showing the various shielding arrangements associated with the reactor compartment and the fuel storage areas adjacent thereto.

Referring now to FIG. 1 of the drawings, an illustrative shielding arrangement adapted for use with the invention is depicted therein. This arrangement includes a vapor container 10 approximately one half of which extends below the ground or grade level indicated by the reference character 12. The vapor container 10 is fabricated generally in the form of a right circular cylinder having hemispherical ends. A biological shielding wall 14 surrounds the major proportion of the exposed area of the vapor container. At one side of the vapor container 10, the shielding wall 14 is extended into the ground, as denoted by the reference character 16, where it forms one wall of a storage bin 18. The bin 18 is substantially filled to ground level with water in order to afford shielding for radioactive fuel elements stored therein. Fuel elements are transferred to the storage bin through a fuel transfer chute 20 which desirably can take the form of the transfer mechanism described and claimed in a copending application of E. Frisch, filed September 21, 1956, Serial No. 611,303 now Patent 3,058,900, dated October 16, 1962, entitled "Transfer Mechanism" and assigned to the present assignee. In the present arrangement, however, the transfer mechanism does not penetrate the wall of the reactor container or vessel. For handling fuel elements within the storage bin, a bridge crane denoted generally by the reference character 22 is provided. The vapor container 10 is supported upon its foundation 24 with a number of supporting columns indicated schematically by reference numerals 26.

Within the vapor container 10, a neutronic reactor 28 is supported and sutabilized by supporting members 30 and 32, which are secured to adjacent shielding walls 34. Beneath the reactor 28 and within a shielded enclosure 36, space is afforded for control rod drive mechanisms (not shown). A moderator storage tank 38 also is positioned within the enclosure 36. Exteriorly of the enclosure 36 a sump arrangement 40 is maintained for the collection of deuterium oxide coolant (when used) in the event of leakage from the reactor 28 or associated equipment. A pump 42 is employed to convey the collected coolant to suitable storage tanks (not shown). Above the sump arrangement 40 a heat exchanger or cooler 44 is disposed for the purpose of removing heat from the moderator circuit. A water filled chamber 46 is arranged about the inward extension of the fuel chute 20 in order to provide biological shielding during fueling operations.

In furtherance of the latter purpose a biologically shielded area 48 is defined generally above the reactor 28 by means of shielding walls 50 and a concrete platform 52. The platform 52 has an apertured rotating shield plug 54 to which a fueling machine 56 is movable by means of a circular crane 58. The fueling machine 56, when aligned with the apertured plug 54, is adapted for grappling each of the fuel elements contained within the pressure tubes which are in turn supported within the reactor 28 in the manner described subsequently. The fueling machine 56 is capable of moving fuel elements from one pressure tube to another and to the upper end of the fuel chute 20. Numerous types of remote handling arrangements adaptable for these functions are available and accordingly a further description thereof is not necessary for the understanding of the present invention. Additional biological shielding can be afforded by flooding the area 48, if desired. The concrete platform 52 is further furnished with an access opening 60 to permit maintenance of the moderator cooler 44 and other components of the reactor plant. When not in use the openings 54 and 60 are closed by stepped plugs (not shown) to prevent radiation streaming.

Figure 2:
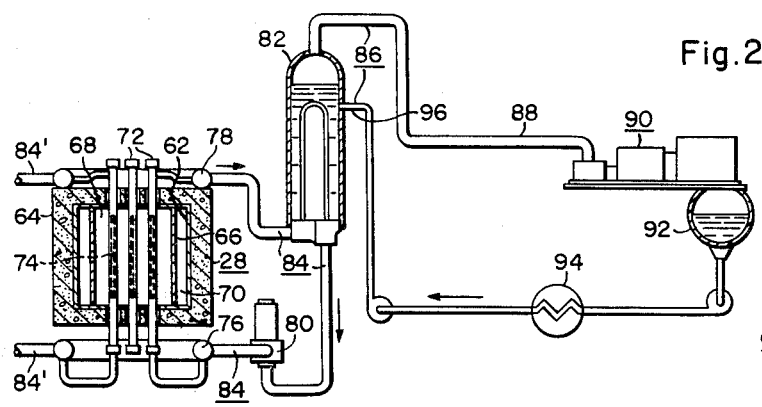
FIG. 2 is a schematic fluid circuit diagram, partially in section, showing the reactor and the primary and secondary coolant loops associated therewith.

Referring now to FIG. 2 of the drawings, the reactor system of the invention is shown in somewhat more detail. Thus the reactor includes a reflector container 62 disposed generally within shielding media denoted by the reference numeral 64. Within the container 62 a moderator tank or partition 66, the structure of which is described in greater detail subsequently, divides the container 62 into a moderator compartment 68 and a reflector compartment 70. Extending through the shielding media 64 and the moderator compartment 68, however, are a plurality of pressure tubes 72 each containing a quantity of nuclear fuel denoted at 74. A coolant fluid such as water or $D_2O$ is circulated through the pressure tubes 72 by means of inlet and outlet headers 76 and 78 respectively. The coolant is positively circulated by means of a canned motor pump 80 such as that disclosed and claimed in U.S. Letters Patent Numbers 2,887,061 and 2,887,062, issued May 19, 1959, to B. Cametti et al., and assigned to the present assignee. The can motor pump 80 together with a steam generating heat exchanger 82 are coupled in the primary coolant loop referenced generally by the numeral 84. Depending upon the size of the reactor 28 additional primary coolant loops can be employed such as that denoted partially at 84'.

In the secondary coolant loop 86, in this arrangement of the invention, the steam generated by the heat exchanger 82 is conveyed through conduit 88 to a steam turbine 90. From the turbine 90 the steam is condensed in the after-condenser 92 and supplied through a regenerative preheater denoted generally at 94 to a feed water inlet 96 of the heat exchanger 82.

Figure 3:
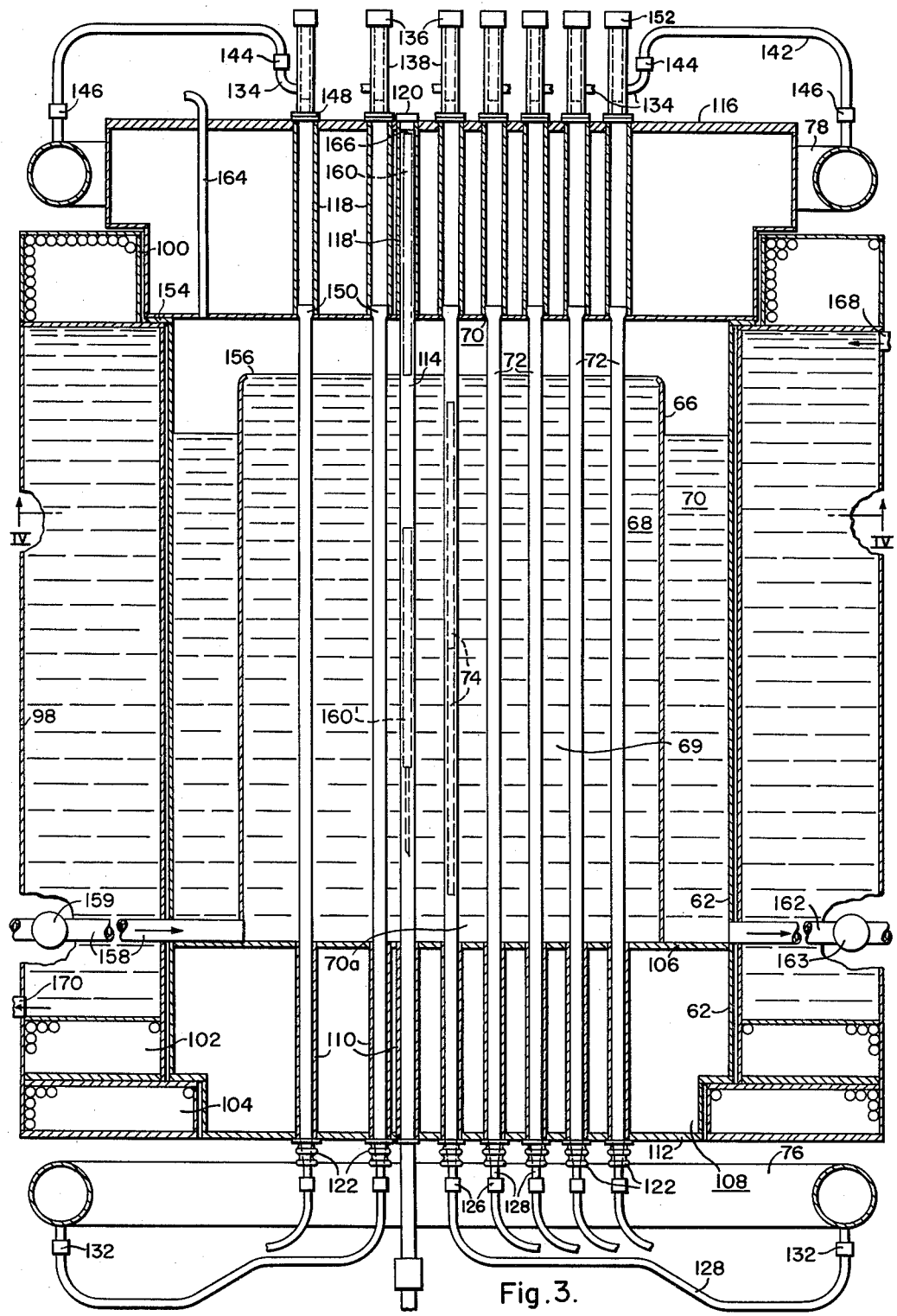
FIG. 3 is a vertical section through the reactor shown schematically in FIG. 2 as taken generally along the reference lines III—III of FIG. 4.
Figure 4:
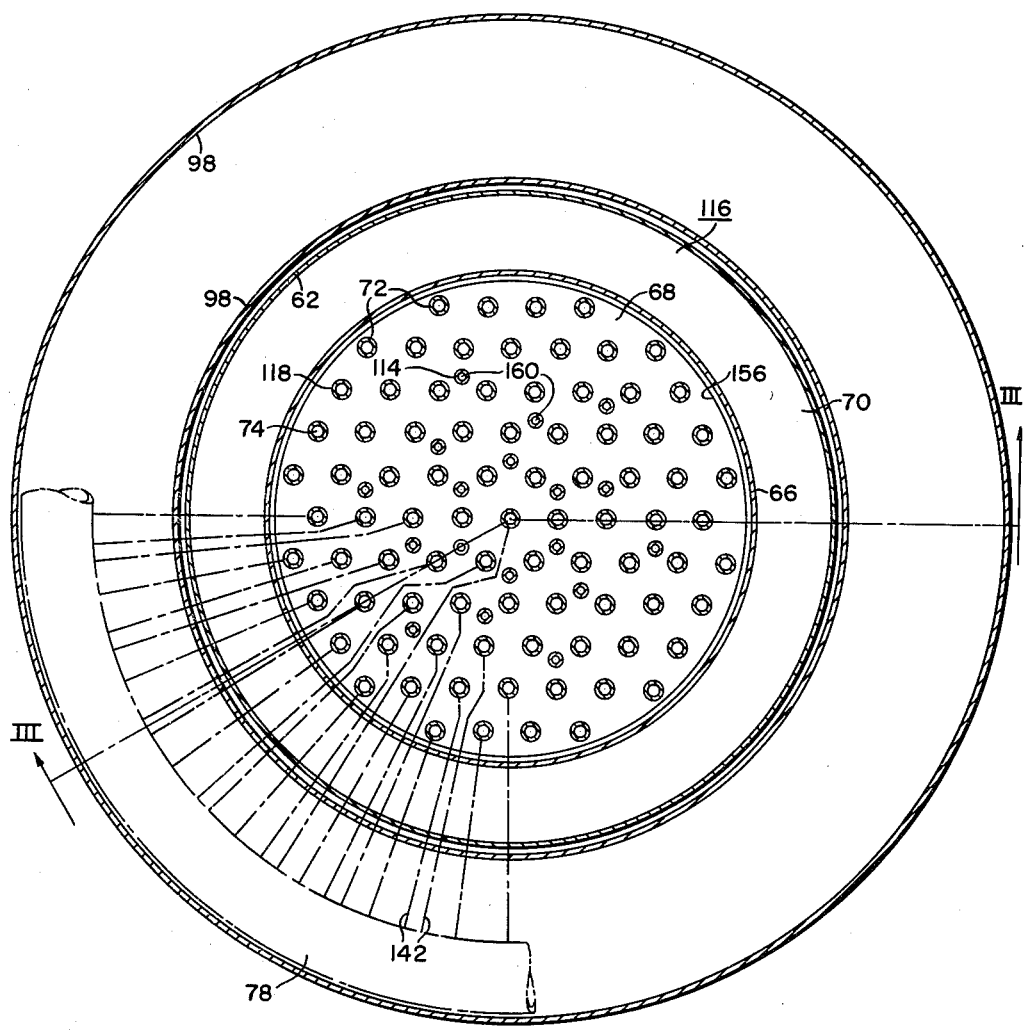
FIG. 4 is a cross sectional view of the reactor shown in FIG. 3 and taken along reference lines IV—IV thereof.

With reference now to FIGS. 3 and 4 of the drawings, a detailed description of this form of the invention will now be presented. In this arrangement of the invention the reactor containing tank 62 is surrounded by an arrangement of shielding tanks comprising the shielding media 64 (FIG. 2) and filled with steel shot or a liquid neutron and other radiation absorber in order to reduce the attendant radiation issuing from the tank 62. The major portion of the cylindrical walls of the container 62 is shielded by an annular tank 98 containing in this example boronated water. Boron, of course, is an efficient neutron absorber. Positioned immediately above and below the boronated water tank 98 are additional tanks 100, 102 and 104 filled with steel shot. The top and bottom shielding tank contains steel shot with interstices filled with boronated water. The steel shot attenuates gammas, while the boronated water slows and absorbs the neutrons. The side shielding tanks contain only boronated water since the adjacent concrete shields afford gamma shielding.

A circular supporting plate 106 is secured adjacent the lower end of the container 62 to define a bottom shielding compartment 108. The compartment 108 likewise is filled with boronated water and steel shot to afford the necessary biological shielding. A number of tubular stays 110 extend through the compartment 108 and are joined hermetically to the plate 106 and to the bottom wall 112 of the container 62. The stays 110 perform the dual function of affording channels through which the pressure tube 72 and control rod sleeves 114 are passed and of affording support to the plate 106 and the bottom wall 112 of the container 62 upon which the major proportion of the reactor weight rests. Alternatively, the supporting plate 106 can form the bottom wall of the reflector tank or container 62, while the compartment 108 can be formed by a separate shielding tank, similar to the upper shielding tank 116 described below.

The container 62 is closed at its upper end by an additional shielding tank 116, which similarly is provided with tubular stays 118 extending therethrough and aligned with the stays 110 of the container chamber 108. The upper shielding tank 116 when lowered into position rests upon and desirably is sealed to a large ring member or washer 154 which overlies the upper edge of the reactor container 62 and the adjacent top surface of the shielding tank 98, which cooperate to lend support to the shielding tank 116. The ring member 154 can, of course, be segmented to facilitate construction thereof. The pressure tubes 72 extend through the latter-mentioned stay tubes 118 adjacent the upper ends of the pressure tubes 72, while the control rod sleeve tubes 114 terminate short of the outer opening of its associated stay tube 118'. The latter stay tubes are closed by plug members 120 to prevent the entry of foreign matter into the control rod sleeves and to reduce radiation streaming. The shielding tank 116 likewise is filled with boronated water and steel shot. Both the shielding tank 116 and the shielding compartment 108 at the lower end of the container 62 are stepped complementarily with the adjacent shot-filled tanks 100, 102 and 104 in order to prevent radiation streaming through the junctions therebetween.

The boronated water or similarly treated absorbing fluid within the annular tank 98 is circulated for cooling purposes and can be removed or replenished from time to time by means of the inlet and outlet conduits denoted by the reference characters 168 and 170 respectively. Similar connections (not shown) can be coupled to the upper shielding tank 116 and the lower shielding compartment 108.

The lower ends of the pressure tubes 72 are joined respectively to a plurality of bellow type expansion joints denoted by the reference characters 122. The bellows joints 122 are of conventional construction and need not be elaborated upon here. The inlet connections are joined through conventional unions 126 to a like number of connecting conduits 128. Similar unions are provided in coupling the conduits 128 to a ring header 76 two of which are illustrated at 132. With this arrangement of course the pressure tubes 72 can be removed individually from the reactor. Use of the expansion joints 122 is desirable inasmuch as heat is being generated in each of the pressure tubes 72 in varying amounts depending upon the position of the tubes within the reactor core. Sufficient clearance, of course, is provided between the lower ends of the tubes 72 and the stay tubes 110 so that the pressure tubes 72 are slidably mounted within the stay tubes 110 respectively.

As indicated previously the upper ends of the pressure tubes 72 protrude a greater distance through the upper shield tank 116. Outlet connections 134 are secured to the pressure tubes 72 outwardly of the adjacent shielding tank 116 but at positions spaced from the extremities of the pressure tubes. In addition, the outlet connections 134 are joined laterally to the pressure tubes 72 so that fuel elements can be inserted and withdrawn relative thereto through the upper ends of the pressure tubes 72 which are closed plug members 136. Desirably an orificing or other flow-regulating device 138 is secured to each of the plug members 136 for the regulation of coolant flow individually through the pressure tubes 72. A suitable type of plug 136 and device 138 is described and claimed in a copending application of P. J. Collins et al., entitled "Pressure Tube Arrangement for a Nuclear Reactor," filed August 31, 1959, Serial No. 837,091 now U.S. Patent 3,167,481, and assigned to Canadian Westinghouse Company, Ltd. Suitable, well-known closure and flow-regulating devices alternatively can be employed. The outlet connections 134 are secured to an upper ring header 78 by means of connecting conduits 142 and unions 144 and 146 in a manner similar to the connections made to the bottom ring header 76. Each of the pressure tubes 72 is partially supported upon the upper shielding tank 116 by means of a collar 148 rigidly secured to the pressure tube at a position of engagement of the collar with the upper wall surface of the tank 116 when the pressure tube is correctly positioned within the reactor container 62. The diameters of the upper end portions of the pressure tubes 72 are expanded as denoted by the reference characters 150 in order to reduce the pressure drop associated with the lateral connections 134 and the orificing devices 138. With this arrangement then each of the pressure tubes 72 can be withdrawn upwardly from the reactor 28 by decoupling the lower unions 126 and severing the connection, for example a welded connection, between the lower end and the associated expansion joint 122 of each pressure tube. The overhanging lateral surfaces 152 of the plugs 136 provide means of engagement with a suitable lifting tool.

As pointed out in connection with FIG. 2, the moderator compartment 68 is segregated from the reflector compartment 70 by means of a cylindrical vertically disposed partition or baffle 66. In this arrangement of the invention the reflector compartment 70 also includes a reflecting volume 70', when filled, disposed immediately above the upper open end 156 of the partition 66. The lower end of the partition rests upon and is sealed to the container plate 106.

Before starting up the reactor the moderator fluid is admitted to the moderator compartment 68 through an inlet conduit 158 until the moderator compartment 68 is substantially filled. Control rods 160, described hereinafter in greater detail, are then withdrawn slowly to approximately the positions whereat the reactor would go critical. Additional moderating fluid then is supplied to the compartment 68 through the inlet conduit 158 so that the moderating fluid overflows the top of the partition 66 and begins to fill the reflecting compartment 70. Filling of the reflector compartment 70 then is continued until the reactor goes critical. During the operation of the reactor, as the core thereof becomes depleted, the level of the reflecting fluid in the chamber 70 is increased to compensate for the progressive burn-up of the fissionable isotope. Shim control of the reactor however is effected by movement of some or all of the control rods 160 since the control rods are more mobile in this respect. The reflector chamber 70 can be drained through the outlet conduit 162 which, as in the case of the inlet conduit 158, extends laterally through the annular shielding tank 98. A similar conduit (not shown) is employed for draining the moderator chamber 68. In a normal operation of the reactor, however, heat is removed from the moderating chamber 68 by adjusting suitable valves 159 and 163, respectively, in the inlet conduits 158 and 162 so that a substantially constant volume of fluid overflows into and drains from the reflector compartment 70 with the result that the reflector level can be maintained static when desired.

Thus the moderator and reflecting fluid is circulated continually through the moderating and reflecting chambers 68 and 70 and to the moderating cooler 44, shown in FIG. 1 of the drawings. The connecting conduits between the cooler 44 and the inlet and outlet 158 and 162 have been omitted for purposes of clarity. It is contemplated that the moderator-reflector arrangement described herein can be employed in a low-power or research reactor, wherein the pressure tube arrangement is replaced by ordinary heterogeneous fuel elements (not shown) and the coolant headers 76 and 78 eliminated so that all of the heat generated in the latter-mentioned fuel elements is transferred to and removed from the reactor by the circulating moderator-reflector liquid.

As the fuel elements 74 approach depletion, the container 62 can be completely flooded so that horizontal reflecting chamber 70' is completely filled with the moderating and reflecting fluid. This arrangement of course attains an additional percentage burn-up in the fuel elements 74. The air entrapped in the container 62 is vented therefrom through the conduit 164 the upper end of which can be connected to suitable radioactive waste disposal means (not shown) or vented to the atmosphere, as desired. Alternatively, if the tank 116 is not sealed to the reflector tank 62, the air can escape through the junction therebetween.

It is anticipated of course that the power level of the reactor can be changed by varying the level in the annular reflecting chamber 70, as in anticipation of peak loads upon the power plant. The reflecting volume is completed by an additional horizontal discoidal segment 70a disposed beneath the lower ends of the lower fuel elements 74, that is to say beneath the active core region 69.

As shown in the drawings the control rods 160 are inserted from the bottom of the reactor container 62. Inasmuch as the control rod sleeves 114 do not communicate with the interior of the reactor but are sealed therefrom by closing the inner end 166 thereof, conventional driving mechanisms can be employed for moving the control rods, for these mechanisms are not subject to normal reactor pressures and temperatures. In this arrangement of the invention the control rods 160 coextend with only a portion of the active height of the reactor core, the total height of which is represented by the combined length of the fuel elements 74. However, the lowermost position of the control rod is that shown at 160' so that the control rods, when scrammed, will drop to a central position within the reactor core relative to the vertical dimension thereof. In furtherance of this purpose the control rods 160, when withdrawn from the core, are displaced upwardly; and the driving mechanism therefor is arranged in a conventional manner to release the control rods upon failure of electric power. Accordingly, the control rod arrangement is completely failsafe inasmuch as no force accumulating means such as springs or pneumatic tanks are required to force the control rods into the reactor in the event of power failure.

The uppermost position of the control rod is represented at 160 in FIG. 3 of the drawings. At the latter position the control rod 160 is completely withdrawn from the active area of the reactor core but still is maintained entirely within the shielding tank 116 and the auxiliary reflecting chamber 70'. Accordingly, no part of the control rod arrangement protrudes above the top surface of the shielding tank 116, where it would interfere with refueling or recycling operations described in connection with FIG. 1 of the drawings. This arrangement results from a fact that the length of the control rod 160 is substantially less than the active height of the reactor core and that the control rod can be withdrawn into the tubular stay 118' of the shielding tank 116. In addition, the arrangement of the shielding tank 116 and its stays 118' together with the foreshortened control rod 160 provide continuous shielding of the control rods which normally become radioactive after a period of exposure within the reactor core. Thus the control rods are maintained at all times within the reactor container 62 or its adjacent shielding media 64 (FIG. 2).

Figure 5:
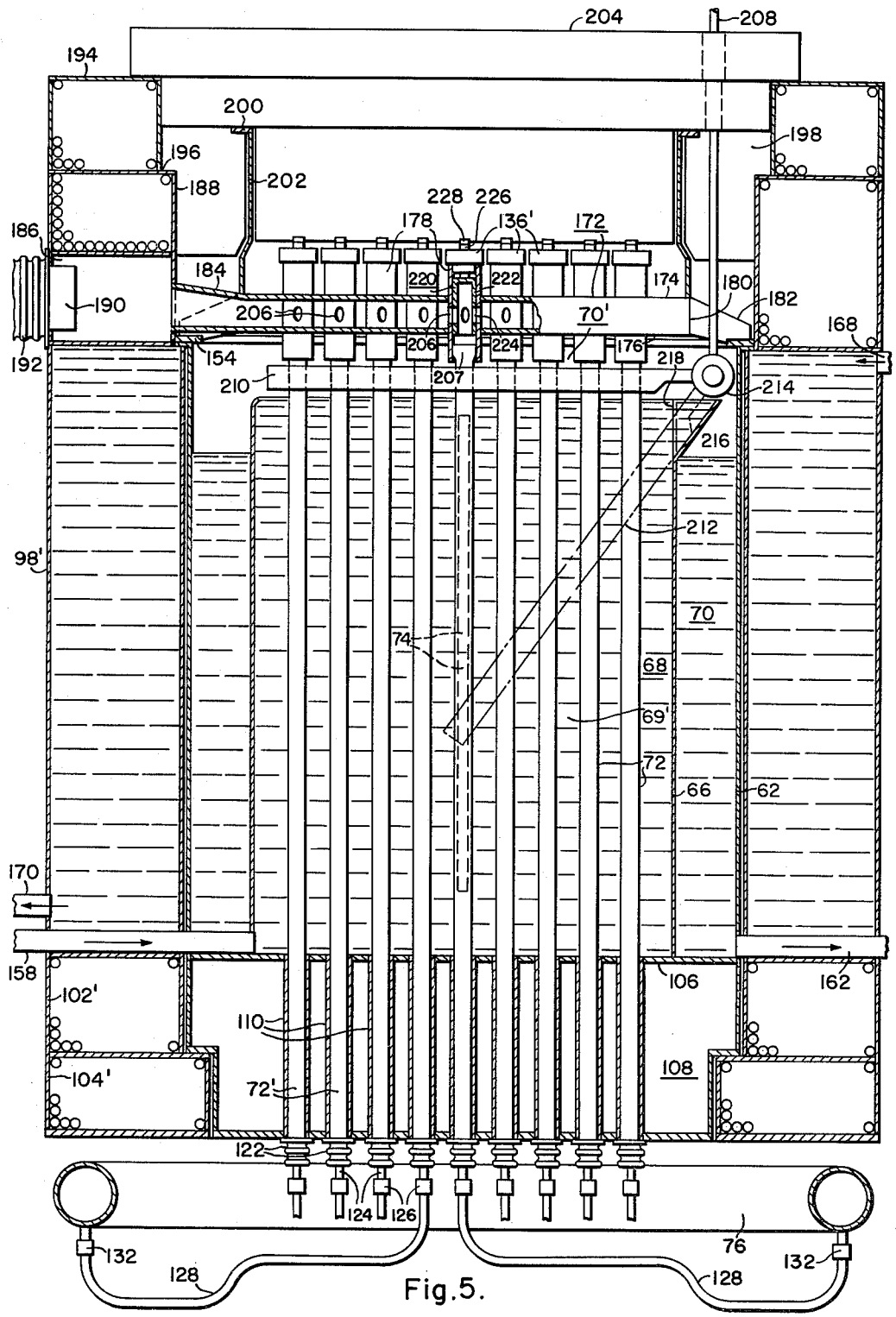
FIG. 5 is a vertically sectioned view of a modified form of the reactor shown in FIG. 3 of the drawings.
Figure 6:
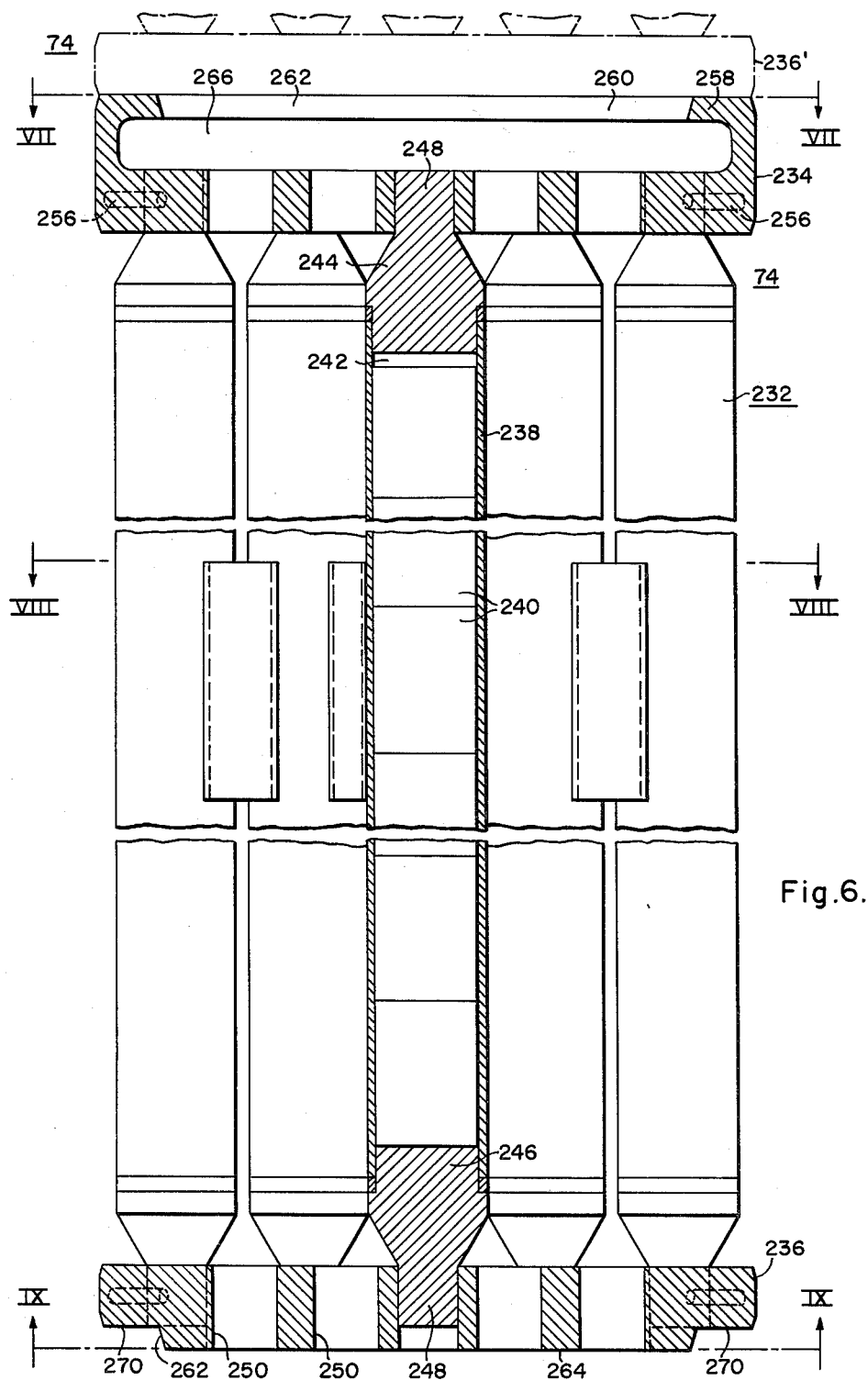
FIG. 6 is an elevational view, partially in section, of one form of fuel assembly adapted for use in the reactor arrangements of FIGS. 3 and 5.

Referring now to FIG. 5 of the drawings, another modification of the reactor of the invention is depicted therein. The overall formation of the reactor of FIG. 5 is generally similar to FIG. 3 and consequently similar reference characters have been employed to identify corresponding parts. In this connection it will be seen that the reflecting tanks 62 of FIGS. 3 and 5 are substantially identical, as is the major proportion of the lower structure of the reactor with the exception that the annular shielding tank 98' is not extended below the reflector container plate 106 and that the steel shot containing tanks 102' and 104' have been modified so as to occupy the increased volume surrounding the shielding chamber 108 of FIG. 5. The lower end structures of the pressure tubes 72' and the ring header 76 and associated components is substantially unchanged. Similarly, the shielding chamber 108 is unchanged except that the passage of control rods therethrough has been eliminated as will be described subsequently in greater detail.

The upper end portion of the reactor has been modified to accommodate the use of a different form of control member (described below) and the use of a "stayed" tube sheet 172 serving as a manifold or collector for the upper ends or outlet portions of the pressure tubes 72' in place of the upper ring header 78 of FIG. 3. The tube sheet 172 in this arrangement is formed from a pair of spaced, substantially circular plates 174 and 176 having series of aligned apertures therein for the passage of tubular end sections 178 of the pressure tubes 72'. Each of the sections 178 is hermetically sealed and rigidly joined to each of the plates 174 and 176. At the outer peripheries of the plates 174 and 176 a short circular member of corresponding diameter 180 is joined thereto in order to complete the tube sheet 172. Accordingly, a rigid, hermetically sealed tube sheet 172 is provided which is able to withstand the various bending stresses and extreme internal pressures applied thereto. This characteristic of the tube sheet 172 is attained by virtue of the fact that its plates 174 and 176 are each rigidly joined to the tubular sections 178 passing therethrough. The tube sheet 172 is supported by a plurality of brackets 182 secured about its periphery, the outer ends of which rests upon the ring member 154 described previously in connection with FIG. 53. An outlet connection 184 of the tube sheet extends therefrom to a boxed-in portion 186 extending radially through an adjacent shot containing shielding tank 188. The boxed-in portion 186 in turn is connected to an outlet conduit 190 by means of a bellows type joint denoted generally by the reference numeral 192. With the exception as to size the joint 192 is similar to the bellows joints 122 described above in connection with FIG. 3.

Resting upon the shot-containing tank 188 is a similar tank 194 of reduced radial thickness so as to form a stepped configuration, denoted by the reference character 196, with the tank 188. The stepped portion 196 provides support for an additional shielding member 198 which can take the form of reinforced, densified concrete of known composition or alternatively can be provided as a tank having the cross section shown and adapted for filling with boronated water or other shielding liquid. A supporting ring member 200, similar to the ring member 154, is joined to the upper surface of the shielding member 198. To the ring member 200 in turn is secured a supporting barrel 202, the lower edge of which is joined to the upper plate 174 of the stayed tube sheet 172. The barrel 202 thus aids in supporting the tube sheet 172, and, if it is desired to flood the area enclosed by the barrel 202 and the tube sheet 172 when loading or unloading fuel elements into the pressure tube 72', the lower edge can be joined water-tight to the tube sheet 172, as by seal welding. It will be seen that the upper shot-containing tank 194, the shielding member 198 and the supporting barrel 202 define a stepped configuration into which the stepped closure or plug 204 is complementarily fitted and seated. The closure 204 can be fabricated in a manner such as that described in connection with the shielding member 198. The stepped configuration 196 and the latter mentioned stepped configuration are employed, of course, to prevent radiation streaming from the reactor core.

As pointed out in connection with FIG. 3 coolant flows upwardly through each of the pressure tubes 72′ where the combined coolant media flowing through the tubes are collected in the stayed tube sheet 172. In furtherance of this purpose each of the end tubular sections 178 are provided with one or more flow apertures 206, with four such apertures being employed in connection with each tube in this form of the invention. The use of the tube sheet 172 and the plurality of flow apertures in each tube section 178 reduces the pressure drops associated with these components and in addition affords a larger volume of flow in the event that some boiling occurs in some or all of the pressure tubes 72′. In addition, the use of the tube sheet 172 facilitates making lateral connections to the pressure tubes 72′ and more particularly to the end tubular sections 178 thereof without restricting the cross sectional flow areas of the tubular sections 178 or hampering the passage of fuel elements 74 and fuel element grapping means (not shown) therethrough. The tubular sections 178 are joined respectively to the expanded ends 207 of the pressure tube 72′ as by welding.

The upper ends of the tubular sections 178 can be closed by a cap or plug member 136′ which, if desired, is formed in a manner similar to that described previously in connection with the plugs 136 and orificing devices 138 of FIG. 3.

Alternatively, an orificing device 220 can be employed in conjunction with the plug 136′. The latter device includes a tubular sleeve 222 having a plurality of apertures 224 therein which in this example correspond with the positions of the apertures 206 in the tubular section 178. The sleeve 222 is closed at its upper end where it is joined to a stub shaft 226. The shaft 226 terminates in a keyed configuration 228 for the application of a suitable manipulating tool. The conventional high temperature packing gland (not shown) is associated with the passage of the shaft 226 through the plug 136′. By turning the shaft 226 and the sleeve 222, the apertures 224 of the latter are displaced relative to the apertures 206 of the tubular section 178. As a result the pressure drop through the pressure tube 72′ is varied thereby regulating the flow of coolant therethrough.

Inserted through openings in the closure 204 and the shielding member 198 is a rotatable driving shaft 208. The driving shaft 208 is arranged for operating a one or more "semaphore" control member 210, which is movable between the top reflecting area 70′ disposed above the active core area and the central portion of the core. The latter position is denoted by the phantom lines 212. The position occupied by the control member 210, as shown, in the auxiliary reflector 70′, represents the least effective position of the control member, while the position 212 represents the most effective position insofar as controlling the nuclear chain reaction is concerned. The former position of course can be rendered still less effective when the auxiliary reflector 70′ is completely filled with moderator as described previously in connection with FIGURE 3. The rotary movement of the driving shaft 208 is transformed into pivotal movement of the control member 210 by means of a conventional gearing arrangement denoted generally by the reference numeral 214.

The operations of the moderator chamber 68 and of the drainable reflector chamber 70 and of the auxiliary reflector chamber 70′ are similar to those described in connection with FIGURE 3 and cooperate with the control member 210 in a similar manner in controlling the reactor, with the exception pointed out previously in connection with the fully raised position of the control member 210. Usage of the semaphore control member is advantageous in that the member can be controlled from the top of the reactor and that the driving mechanism for the control member is disposed at a position which is removed from the fuel handling or reloading area at the top of the reactor.

A triangularly shaped channel member 216 is secured to a slit or vertically elongated opening 218 of the moderator partition or baffle 66 in order to accommodate the control member 210 in its downward positions without lessening the effective height of the moderator partition 66.

It is evident, of course, that the control member arrangement of FIGURE 5 can be employed with the reactor shown in FIGURE 3 and conversely that the control rod arrangement of FIGURE 3 can be employed in the reactor described in connection with FIGURE 5. In these arrangements of the invention the control rods 160 and the control member 210 are formed from cadmium which is clad with aluminum, since the moderator chamber 68 is operated at low temperature.

Referring now to FIGURES 6 to 9 of the drawings an exemplary form of a fuel element assembly 74 adapted for insertion into the pressure tubes 72 or 72′ is disclosed therein. In this arrangement of the invention the assembly 74 includes a total of 19 fuel rods or members 232 which are joined at their ends to end plates 234 and 236. The fuel members 232 each include a cladding tube 238 and a plurality of pellets 240, in this example fabricated from uranium oxide ($UO_2$) inserted in tandem along the length of the cladding tube 238. A differential expansional space 242 is left at the top of each cladding tube. The cladding tube 238 is closed and hermetically sealed at its ends respectively by a pair of plug members 244 and 246. The outward ends of the plug members 244 and 246 are tapered to stud or rod-like projections or extensions 248 for insertion into corresponding apertures of the end plates 234 and 236. In addition, the tapered plug members 244, 246 permit the use of larger flow openings 250 in each of the end plates 234 and 236, as better shown in FIGURE 7 of the drawings. The fuel rods 232 are joined laterally at a position intermediate the end plates 234 and 236 by means of a group of ferrules 252 and 254 of differing sizes depending upon the lattice arrangement of the fuel rods 232 adjacent each ferrule. Desirably one such lateral junction is employed and is disposed adjacent the longitudinal center of the fuel assembly so as to least interfere with the differential expansion arrangement described below. The use of ferrules in this connection is described more fully in a copending application of E. Frisch, entitled "Fuel Element Assembly for a Nuclear Reactor," filed January 23, 1957, Serial No. 635,911, now abandoned, and assigned to the present assignee. Suffice it to say, however, that the ferrules are abrazed at their junctions with adjacent fuel rods 232 and thus impart considerable bending resistance to the fuel element assembly 74 along its long axis, while introducing little resistance to coolant flow.

In this example the end plates 234 and 236 are circular and are arranged to fit closely within the pressure tubes 72 or 72′. The twelve outermost members 232, which are spaced uniformly about a circle passing through their centers, are joined, in this example, rigidly to the end plates 234 and 236, as by passing pins 256 radially through suitably placed apertures in the circumferential edges of the plates 234 and 236 and alignable apertures or openings in the stud portions 248 of the associated fuel members. Alternatively, the stud portions 248 of the outermost fuel members can be secured to the respective end plates by means of cap screws (not shown), threaded into threaded apertures (not shown) in the free ends of the stud portions 248 or by peening or otherwise expanding the stud portions into the surrounding metal of the plates 234 and 236. The seven inner fuel members, which are secured on a triangular pitch to the end plates 234 and 236, can be secured in a similar manner if desired; however, in this example, it is preferable to slidably mount the stud portions 248 thereof in the corresponding apertures of the end plates 234 and 236 to allow for differential thermal expansion. In this arrangement it is desirable to leave the innermost fuel rods 232 free to move in this manner inasmuch as the outermost twelve rods will attain a higher temperature due to their proximity to the moderator fluid on the outer side of the pressure tubes. In other applications, however, where the innermost fuel members or rods run hotter, it is contemplated that the innermost members can be joined rigidly to the end plates 234 and 236 and that the outermost members can be slidably mounted.

The upper end plate 234 is provided with an inwardly extending lip portion 258 which, as better shown in FIGURE 7, coextends with the circumference of the end plate 234. The lip 258, in addition to serving as a lifting means for the fuel element assembly 74, is provided with a beveled inner edge portion 260 which closely engages a similarly beveled outer edge portion 262 on a circular projection 264 extending downwardly from a lower end plate 236′ of a similar fuel element assembly. When thus engaged, the lower end plate 236′ and the upper end plate 234 enclose a chamber 266 into which the flow apertures of each end plate 236′ and 234 communicate. In this manner continuous flow passages through two or more of the fuel elements 74 when joined in this manner in tandem is assured, for this arrangement obviates the necessity of aligning or collating the respective apertures 250 in the plates 236′ and 234.

In this example of the invention, two of the fuel elements 74 are supported in tandem in each of the pressure tubes 72 or 72′ (FIGS. 3 and 5 respectively). As shown in FIGURE 10, the lower plate 236′ of the lower fuel element 74′ rests upon an inwardly extending shoulder 268 formed interiorly of the associated pressure tube at a position adjacent the lower end of the core area 69 or 69′. The shoulder 268 desirably engages only the relatively thinner peripheral area 270 of the lower plate. The upper fuel element 74 (FIGURES 3 and 5) rests upon the upper plate 234 of the lower fuel element in the manner described in connection with FIGURE 6.

It will be apparent further that the fuel elements 74 of each pressure tube 72 or 72′ are identical so that the fuel elements can be recycled either longitudinally in each pressure tube or laterally to other pressure tubes of the reactor core. In this manner the maximum percentage burnup can be achieved.

The following tabulation of design parameters and heat and material balances are presented as a guide to the construction of a reactor plant embodying the present invention with the obvious intent that the tabulation is merely exemplary of an illustrative application of the invention and not limitative thereof. Obviously differing parameters and balances can be selected by the nuclear engineer upon the basis of readily available technology, when constructing a nuclear plant having a differing power rating.

The core design parameters are as follows:

Rated heat output, mw. (thermal) _____ 60.5
Coolant flow:
    Total rate, lb. per hr. _____ 3,200,000
    Velocity along fuel rods, f.p.s. _____ 14.0
Heat transfer:
    Active surface, sq. ft. _____ 1,840
    Average flux, B.t.u./hr./sq. ft. _____ 112,000
    Maximum flux, B.t.u./hr./sq. ft. _____ 228,000
Fuel pellet:
    Diameter, in. _____ 0.445
    Height, in. _____ 0.600
    Uranium dioxide loading, lb. _____ 8,500
Fuel element assembly:
    Overall diameter, in. _____ 2.77
    Length, ft.-in. _____ 4–4½
    No. of fuel rods _____ 19
    Diam. of fuel rods, in. _____ 0.5
    Cladding thickness, mils _____ 25
    No. of pellets per rod _____ 100

The following data are based on an average burnup of 10,000 mw. days per ton to be obtained by recycling fuel elements both radially and axially:

Equivalent initial enrichment (atom percent $U^{235}$) _____ 2.0
Initial loading, kg.:
    $U^{235}$ _____ 68.2
    $U^{238}$ _____ 3,342
Days full power irradiation _____ [1] 625
Initial conversion ratio _____ 0.51
Average conversion ratio _____ 0.44
Equivalent enrichment after irradiational cycle (atom percent) _____ 1.1
Fuel after irradiation, kg.:
    $U^{235}$ _____ 39.8
    $U^{236}$ _____ 4.4
    $U^{238}$ _____ 3,321
    $Pu^{239}$ _____ 3.5
    $Pu^{240}$ and $Pu^{241}$ _____ 7.0
Fraction of energy from:
    $U^{235}$ _____ 0.61
    $U^{238}$ _____ 0.05
    Plutonium _____ 0.34

[1] 15,000 hr.

Basic data and information on the design of the nuclear plant are summarized as follows:

Reactor:
    Reactor type _____ Thermal heterogeneous.
Nominal rated output, mw. (thermal) _____ 60.5.
Materials:
    Fuel _____ $UO_2$ pellets.
    Fuel element cladding _____ Zircaloy-2.
    Moderator _____ Heavy water.
    Reflector _____ Heavy water.
    Primary coolant _____ Heavy water.
    Reactor tank _____ Aluminum.
    Pressure tubes _____ Zircaloy-2.
    Moderator and reflector tanks ___ Aluminum.
Core:
    Length of active core, ft.-in. _____ 8–5.
    Length of individual fuel elements, ft.-in. _____
    Number of fuel elements per tube _____ 2.
Pressure tube:
    Length of pressure tube, ft.-in. ____ 20–5.
    Diameter of pressure tube flow channel, in. I.D. _____ 2.82
    Diameter of pressure tube, in. O.D. _____ 3.68.
Moderator and reflector tank:
    Diameter of moderator tank (baffle), ft.-in. _____ 6–8½.
    Diameter of reflector tank, ft.-in. _____ 9–0.
    Side reflector thickness, in. _____ 13½.
    Top reflector thickness, in. _____ 12.
    Bottom reflector thickness, in. _____ 12.
    Overall height of reflector chamber, ft.-in. _____ 11–0
    Overall height of moderator chamber, ft.-in. _____ 9.0
Shield tank:
    Overall height, ft.-in. _____ 12–4.
    Diameter, ft.-in. _____ 14–0.
Reactor primary coolant system:
    Temperature to reactor, °F. _____ 526.
    Temperature rise, average, °F. ___ 48.
    Mixed mean outlet temperature, °F. _____ 574.

| | |
|---|---|
| Highest pressure tube outlet temperature, °F. | 596. |
| Maximum coolant velocity in pressure tubes, f.p.s. | 14. |
| Operating pressure, p.s.i.a. | 1,500. |
| Design pressure, p.s.i.a. | 1,800. |
| Pressure drop across core, maximum, p.s.i. | 25. |
| Flow rate, lb. per hr. | 3,200,000. |
| Flow rate, g.p.m. | 7,200. |
| Maximum heat flux, B.t.u./hr./sq. ft. | 228,000. |
| Average heat flux, B.t.u./hr./sq. ft. | 112,000. |
| Maximum fuel pellet center temperature, °F | 4,270 |
| Number of pressure tubes | 85. |
| Number of flow in each about | 85 g.p.m. |
| Number of primary loops | 1. |
| Number of primary coolant pumps | 2. |
| Size of primary loop piping, in. | 12. |
| Size of reactor inlet and outlet ring headers, in. | 10. |
| Moderator circulatory system (385,000 p.p.h.): | |
| Inlet temperature, °F. | 120. |
| Outlet temperature, °F. | 160. |
| Heat absorbed in moderator, mw. | 4.5 |
| Steam data: | |
| Steam generated, lb. per/hr. | 203,000. |
| Pressure at steam generator, maximum, p.s.i.a. | 700. |
| Temperature at steam generator, °F. | 503. |
| Equivalent electrical output: | |
| Gross electrical, kw. | 18,850. |
| Net electrical, kw. | 16,950 |

From the foregoing tabulation, it will be evident that the present invention is capable of considerable design variation by one skilled in the art without departing from the spirit and scope thereof. For example, it will be apparent that numerous configurations of the various components described or disclosed herein can be employed within the spirit of the invention. In this light it is to be noted that the aforementioned materials and dimensions are but exemplary of one application of the invention. For example, other material such as $U^{233}$ or $Pu^{239}$ can be employed as the enriching isotope while other material such as thorium 232 can be substituted for the fertile material $U^{238}$. It is also apparent and within the skill of the nuclear engineer that differing structural or moderating materials can be employed by making compensatory adjustments in the enrichment of the fissile material or in fuel inventory. For example, light water or an organic liquid can be substituted for deuterium oxide and similarly, stainless steel and aluminum alloys can be employed in place of Zircaloy-2 or aluminum where designated. It will be apparent also to the nuclear engineer that certain features of the invention can be employed without a corresponding use of other features thereof.

Accordingly, what is claimed as new is:

1. In a neutronic reactor the combination comprising a reflector tank, a moderator baffle tank spaced inwardly of said tank, the lower end of said baffle tank being joined liquid tight to said reflector tank, said baffle tank having an upper opening adjacent the top of the reflector tank so that it can retain a liquid at a level higher than that in said reflector tank, means for supporting a mass of fissile material within said baffle tank, and means for supplying a moderator liquid interiorly of said baffle tank and for withdrawing said liquid from said reflector tank but exteriorly of said baffle tank so that the level of said liquid can be varied within said reflector tank and outwardly and independently of the liquid within said baffle tank.

2. In a neutronic reactor the combination comprising an upstanding generally tubular reflector tank, a lower supporting member secured adjacent the bottom of said tank, a generally tubular upstanding baffle tank resting upon said supporting member and sealed liquid tight thereto, said baffle tank terminating short of the top of said reflector tank and being open at its upper end for communication therewith, means for supporting a mass of fissile material within said baffle tank, and means for supplying a moderating liquid interiorly of said baffle tank and for withdrawing said liquid from said reflector tank but exteriorly of said baffle tank so that the level of said liquid within said reflector tank can be varied independently of the level of liquid in said moderator baffle tank.

3. In a neutronic reactor the combination comprising an upstanding generally tubular reflector tank, a lower supporting member secured adjacent the bottom of said tank, a generally tubular upstanding baffle tank resting upon said supporting member and sealed liquid tight thereto, said baffle tank terminating short of the top of said reflector tank and being open at its upper end for communication with said reflector tank, a plurality of pressure tubes extending in a generally parallel spaced array through said baffle tank and at least one fuel element containing fissile material inserted into each of said pressure tubes, means for circulating a coolant fluid through each of said pressure tubes, and means for supplying a moderating liquid interiorly of said baffle tank and for withdrawing said liquid from said reflector tank but exteriorly of said baffle tank so that the level of said liquid within said reflector tank can be varied independently of the level of liquid in said moderator baffle tank.

4. In a neutronic reactor the combination comprising an upstanding generally tubular reflector tank, a generally tubular upstanding baffle resting upon a bottom wall of said tank and sealed liquid tight thereto, said baffle terminating short of the top of said reflector tank and being open at its upper end for communication therewith, a plurality of pressure tubes extending in a generally parallel spaced array through said baffle and at least one fuel element containing fissile material inserted into each of said pressure tubes, means for circulating a coolant fluid through each of said pressure tubes, and means for supplying a moderating liquid interiorly of said baffle and for withdrawing said liquid from said reflector but exteriorly of said baffle so that the level of said liquid within said reflector tank can be varied independently of the level of liquid in said moderator baffle, an upper shielding tank coextending with the top of said reflector tank, a bottom shielding tank coextending with the bottom of said reflector tank, each of said pressure tubes extending through said upper and lower tanks, and means for slidably mounting each of said pressure tubes relative to at least one of said tanks to permit differential expansion among said pressure tubes.

5. In a neutronic reactor the combination comprising an upstanding generally tubular reflector tank, a generally tubular upstanding baffle resting upon a bottom wall of said tank and sealed liquid tight thereto, said baffle terminating short of the top of said reflector tank and being open at its upper end for communication therewith, a plurality of pressure tubes extending in a generally parallel spaced array through said baffle and at least one fuel element containing fissile material inserted into each of said pressure tubes, means for circulating a coolant fluid through each of said pressure tubes, and means for supplying a moderating liquid interiorly of said baffle and for withdrawing said liquid from said reflector but exteriorly of said baffle so that the level of said liquid within said reflector tank can be varied independently of the level of liquid in said moderator baffle, an upper shielding tank coextending with the top of said reflector tank, a lower shielding tank coextending with the bottom of said reflector tank, a plurality of stay tubes extending through each of said upper and said lower shielding tanks, each of said stay tubes being joined and sealed to opposite wall surfaces of the associated shielding tank and being aligned with the stay tubes of the other shielding tank, said pressure tubes extending respectively through the stay tubes of one of said shielding tanks and being slidably mounted therein, and said pressure tubes being joined to the stay tubes of the other tank.

6. In a neutronic reactor the combination comprising an upstanding generally tubular reflector tank, a generally tubular upstanding baffle resting upon a bottom wall of said tank and sealed liquid tight thereto, said baffle terminating short of the top of said reflector tank and being open at its upper end for communication therewith, a plurality of pressure tubes extending in a generally parallel spaced array through said baffle and at least one fuel element containing fissile material inserted into each of said pressure tubes, means for circulating a coolant fluid through each of said pressure tubes, and means for supplying a moderating liquid interiorly of said baffle and for withdrawing said liquid from said reflector but exteriorly of said baffle so that the level of said liquid within said reflector tank can be varied independently of the level of liquid in said moderator baffle, an upper shielding tank coextending with the top of said reflector tank, a lower shielding tank coextending with the bottom of said reflector tank, a plurality of stay tubes extending through one of said tanks and being joined and sealed adjacent their ends to opposite walls of said one shielding tank, said pressure tubes respectively extending through said stay tubes and being slidably mounted therein, and means for extending said pressure tubes through the other of said shielding tanks.

7. In a neutronic reactor the combination comprising an upstanding generally tubular reflector tank, a generally tubular upstanding baffle resting upon a bottom wall of said tank and sealed liquid tight thereto, said baffle terminating short of the top of said reflector tank and being open at its upper end for communication therewith, a plurality of pressure tubes extending in a generally parallel spaced array through said baffle and at least one fuel element containing fissile material inserted into each of said pressure tubes, means for circulating a coolant fluid through each of said pressure tubes, and means for supplying a moderating liquid interiorly of said baffle and for withdrawing said liquid from said reflector but exteriorly of said baffle so that the level of said liquid within said reflector tank can be varied independently of the level of liquid in said baffle, an upper shielding tank coextending with the top of said reflector tank, a bottom shielding tank coextending with the bottom of said reflector tank, each of said pressure tubes extending through said upper and lower tanks and means for slidably mounting each of said pressure tubes relative to at least one of said tanks to permit differential expansion among said pressure tubes, a control rod channel member extending through one of said shielding tanks and into the other of said shielding tanks, said channel member extending through said baffle, and a control rod inserted into and movable within said channel member, the length of said control rod being substantially less than the height of said baffle, the thickness of said other shielding tank and the length of said control rod being further proportioned so that said control rod can be fully withdrawn from said moderator tank to a position where at least the major proportion of said control rod is enclosed within said other shielding tank so that said control rod and its channel member do not protrude from said reactor.

8. In a neutronic reactor the combination comprising an upstanding generally tubular reflector tank, a generally tubular upstanding baffle resting upon a bottom wall member of said tank and sealed liquid tight thereto, said baffle terminating short of the top of said reflector tank and being open at its upper end for communication therewith, means for supporting a mass of fissile material within said baffle, the region between the top of said reflector tank and the top of said baffle member defining an auxiliary reflector volume generally overlying said baffle member, and valved conduit means for adding a moderator liquid interiorly of said baffle member and for withdrawing said liquid from said reflector tank but exteriorly of said baffle so that the level of liquid within said reflector tank can be varied above and below said baffle to fill and drain said auxiliary reflecting volume and the remaining exterior portions of said reflector tank relative to said baffle.

9. In a neutronic reactor the combination comprising an upstanding generally tubular reflector tank, a generally tubular upstanding baffle resting upon a bottom wall member of said tank and sealed liquid tight thereto, said baffle terminating short of the top of said reflector tank and being open at its upper end for communication therewith, means for supporting a mass of fissile material within said baffle, the region between the top of said reflector tank and the top of said baffle member defining an auxiliary reflector volume generally overlying said baffle member, valved conduit means for adding a moderator liquid interiorly of said baffle member and for withdrawing said liquid from said reflector tank but exteriorly of said baffle so that the level of liquid within said reflector tank can be varied above and below said baffle to fill and drain said auxiliary reflecting volume and the remaining exterior portions of said reflector tank relative to said baffle, a semaphore control member, and means mounted adjacent an upper wall member of said reflector tank for pivoting said control member between a position fully within said auxiliary reflecting volume and a position whereat said control member is substantially completely within said baffle member.

10. A fuel element assembly for a neutronic reactor, said assembly comprising a pair of spaced end plates, a plurality of elongated fuel members extending between said end plates and joined at their ends respectively to said end plates, a plurality of flow apertures extending through each of said end plates, a generally outwardly extending lifting lip structure formed on one of said end plates on a side opposite said fuel members, said lip structure extending outwardly of and being spaced from the apertures in said one end plate, said lip structure being shaped to accommodate a complementary projection formed on the outer side of an end plate of an adjacent fuel element assembly so that said one end plate and said adjacent fuel element assembly end plate cooperate to enclose a chamber with which the flow apertures of each of said last-mentioned end plates communicate.

11. A fuel element assembly for a neutronic reactor, said assembly comprising a pair of spaced end plates, a plurality of elongated fuel members extending between said end plates, each of said members terminating at their ends in rod-like extensions, one of the groups comprising the inner and outer fuel members respectively having their projections extending into closely fitting apertures in said end plates respectively and being rigidly secured therein, the other of said groups having their projections slidably mounted within apertures therefor in said end plates respectively so that differential thermal expansion is afforded between said groups, a plurality of flow apertures extending through each of said end plates, and inwardly extending lifting lip structure formed on one of said end plates on a side opposite said fuel members, said lip structure extending outwardly of and being spaced from the apertures in said one end plate, said lip structure being shaped to accommodate a complementary projection formed on the outer side of a flow-apertured end plate of an adjacent fuel element assembly so that said one end plate and said adjacent fuel element assembly end plate cooperate to enclose a chamber with which the flow apertures of each of said last-mentioned end plates communicate.

12. In a neutronic reactor the combination comprising an upstanding generally tubular reflector tank, a lower supporting member secured adjacent the bottom of said tank, a generally tubular upstanding baffle resting upon said supporting member and sealed liquid-tight thereto, said baffle terminating short of the top of said reflector tank and being open at its upper end for communication therewith, a plurality of upstanding pressure tubes extending in a generally parallel spaced array through said baffle and at least two fuel element assemblies containing fissile material inserted into each of said pressure tubes, each of said assemblies including a pair of spaced end plates, a plurality of elongated fuel members extending longitudinally of their associated pressure tube and between said end plates, said fuel members being joined at their ends respectively to said end plates, a plurality of flow apertures extending through each of said end plates, an inwardly extending lifting lip structure formed on the upper end plate of each said assemblies on a side opposite said fuel members, said lip structure extending upwardly of and being spaced from the apertures in said upper end plate, the lip structure of each assembly being shaped to accommodate a complementary projection formed on the lower side of the lower end plate of the other fuel element assembly so that adjacent end plates of said assemblies when disposed in their associated pressure tube in tandem cooperate to enclose a chamber with which the flow apertures of each of said adjacent end plates communicate, means for circulating a coolant fluid through each of said pressure tubes and said fuel element assemblies, and means for supplying a moderating liquid interiorly of said baffle and for withdrawing said liquid from said reflector but exteriorly of said baffle so that the level of said liquid within said reflector tank can be varied independently of the level of liquid in said moderator baffle.

13. In a neutronic reactor the combination comprising an upstanding generally tubular reflector tank, a lower supporting member secured adjacent the bottom of said tank, a generally tubular upstanding baffle resting upon said supporting member and sealed liquid-tight thereto, said baffle terminating short of the top of said reflector tank and being open at its upper end for communication with said tank, a plurality of upstanding pressure tubes extending in a generally parallel spaced array through said baffle and at least one fuel element assembly inserted into each of said pressure tubes, said assembly including a pair of spaced end plates, a plurality of elongated fuel members extending between said end plates and longitudinally of their associated pressure tube, each of said fuel members terminating at their ends in rod-like extensions, one of the groups comprising the inner and outer fuel members respectively having their projections extending into closely fitting apertures in said end plates respectively and being rigidly secured therein, the other of said groups having their projections slidably mounted within apertures therefor in said end plates respectively so that differential thermal expansion is afforded between said groups, means for circulating a coolant fluid through each of said pressure tubes, and means for supplying a moderating liquid interiorly of said baffle and for withdrawing said liquid from said reflector but exteriorly of said baffle so that the level of said liquid within said reflector tank can be varied independently of the level of liquid in said moderator baffle.

14. In a neutronic reactor the combination comprising an upstanding generally tubular reflector tank, a lower supporting member secured adjacent the bottom of said tank, a generally tubular upstanding baffle resting upon said supporting member and sealed liquid-tight thereto, said baffle terminating short of the top of said reflector tank and being open at its upper end for communication with said tank, a plurality of upstanding pressure tubes extending in a generally parallel spaced array through said baffle and at least two fuel element assemblies inserted into each of said pressure tubes, each of said fuel element assemblies including a pair of spaced end plates, a plurality of elongated fuel members extending between said end plates and longitudinally of their associated pressure tube, each of said fuel members terminating at their ends in rod-like extensions, one of the groups comprising the inner and outer fuel members respectively having their projections extending into closely fitting apertures in said end plates respectively and being rigidly secured therein, the other of said groups having their projections slidably mounted within apertures therefor in said end plates respectively so that differential thermal expansion is afforded between said groups, a plurality of flow apertures extending through each of said end plates, and inwardly extending lifting lip structure formed on the upper end plate of each assembly on a side opposite said fuel members, said lip structure extending upwardly of and being spaced from the apertures in said upper end plate, said lip structure being shaped to accommodate a complementary projection formed on the underside of the lower end plate of the adjacent fuel element assembly when said assemblies are mounted in tandem within their associated pressure tube so that said last-mentioned end plates cooperate to enclose a chamber with which the flow apertures of each of said last-mentioned end plates communicate, means for circulating a coolant fluid through each of said pressure tubes and their associated fuel element assemblies, and means for supplying a moderating liquid interiorly of said baffle and for withdrawing said liquid from said reflector tank but exteriorly of said baffle so that the level of said liquid within said reflector tank can be varied independently of the level of liquid in said moderator baffle.

15. In a neutronic reactor the combination comprising a containing vessel, a plurality of upstanding pressure tubes extending through said vessel in a generally parallel spaced array, at least two fuel element assemblies disposed in tandem within each of said pressure tubes, each pressure tube having removable closure means adjacent the upper end thereof through which the associated fuel element assemblies can be inserted and removed, each of said fuel element assemblies including a pair of spaced end plates, a plurality of elongated fuel members extending between said end plates and joined at their ends respectively to said end plates, a plurality of flow apertures extending through each of said end plates, a generally outwardly extending lifting lip structure formed on the upper end plate of each assembly on a side opposite said fuel members, said lip structure extending outwardly of and being spaced from the apertures in said upper end plate, said lip structure being shaped to accommodate a complementary projection formed on the underside of the lower end plate of the adjacent fuel element assembly so that said last-mentioned end plates cooperate to enclose a chamber with which the flow apertures of each of said last-mentioned end plates communicate, a neutron moderating material contained within said vessel but exteriorly of said pressure tubes, and means for circulating a coolant fluid through each of said pressure tubes and their associated fuel element assemblies.

16. In a neutronic reactor the combination comprising a vessel, a plurality of pressure tubes extending through said vessel in a generally parallel spaced array, each of said pressure tubes having at least one fuel element assembly mounted therein, each of said assemblies including a pair of spaced end plates, a plurality of elongated fuel members extending between said end plates and longitudinally of their associated pressure tube, each of said fuel members terminating at their ends in rod-like extensions, said fuel members being grouped into inner and outer fuel members, one of the groups comprising the inner and outer fuel members respectively having their projections extending into closely fitting apertures in said end plates respectively and being rigidly secured therein, the other of said groups having their projections slidably mounted within apertures therefor in said end plates respectively so that differential thermal expansion is afforded between said groups, a neutron moderating material contained within said vessel but exteriorly of said pressure tubes, and means for circulating a coolant fluid through each of said pressure tubes and their associated fuel element assemblies.

References Cited by the Examiner

UNITED STATES PATENTS

| | | | |
|---|---|---|---|
| 2,799,642 | 7/57 | Hurwitz et al. | 176—71 |
| 2,863,815 | 12/58 | Moore et al. | 176—29 |
| 2,879,216 | 3/59 | Hurwitz et al. | 176—43 |
| 2,885,335 | 5/59 | Moore et al. | 176—77 |
| 2,898,280 | 8/59 | Schultz | 176—78 |
| 2,902,422 | 9/59 | Hutter | 176—78 |
| 2,977,297 | 3/61 | Evans et al. | 176—81 |

OTHER REFERENCES

Nucleonics, vol. 16, No. 4, April 1958, pp. 56–57 (Fig. 4).

References Cited by the Applicant

UNITED STATES PATENTS

| | | |
|---|---|---|
| 3,096,264 | 7/63 | Bauer. |

CARL D. QUARFORTH, *Primary Examiner.*

ROGER L. CAMPBELL, REUBEN EPSTEIN,
*Examiners.*